US009183229B2

(12) United States Patent
Klassen et al.

(10) Patent No.: US 9,183,229 B2
(45) Date of Patent: *Nov. 10, 2015

(54) SYSTEM AND METHOD FOR SELECTING A GEOGRAPHIC LOCATION TO ASSOCIATE WITH AN OBJECT

(71) Applicant: BLACKBERRY LIMITED, Waterloo (CA)

(72) Inventors: Gerhard Dietrich Klassen, Waterloo (CA); Thomas P. Murphy, Ottawa (CA); Gordon Gregory Bowman, Kanata (CA)

(73) Assignee: BlackBerry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/329,169

(22) Filed: Jul. 11, 2014

(65) Prior Publication Data

US 2014/0321774 A1    Oct. 30, 2014

Related U.S. Application Data

(63) Continuation of application No. 11/754,830, filed on May 29, 2007, now Pat. No. 8,803,980.

(51) Int. Cl.
*G06F 17/30* (2006.01)
*H04N 1/21* (2006.01)
*G01S 19/39* (2010.01)

(52) U.S. Cl.
CPC ........... *G06F 17/30268* (2013.01); *G01S 19/39* (2013.01); *H04N 1/2125* (2013.01)

(58) Field of Classification Search
CPC .............. H04N 2101/00; H04N 5/232; H04N 5/23293; H04N 1/2125; G06F 17/30268; G01S 19/39

USPC .................. 348/207.1, 231.2, 116, 148, 158, 348/333.06–333.12; 701/300; 715/810
See application file for complete search history.

(56) References Cited

U.S. PATENT DOCUMENTS

| | | | |
|---|---|---|---|
| 2002/0047904 A1* | 4/2002 | Okada ........................... 348/207 |
| 2004/0174434 A1* | 9/2004 | Walker et al. .............. 348/211.3 |
| 2005/0243189 A1* | 11/2005 | Parulski et al. ............ 348/231.3 |
| 2007/0081643 A1* | 4/2007 | Divine ...................... 379/100.01 |
| 2007/0213925 A1* | 9/2007 | Sharma et al. ................ 701/201 |

OTHER PUBLICATIONS

Canadian Intellectual Property Office, Office Action on Application No. 2,632,172, Issued on Jul. 13, 2015.

* cited by examiner

*Primary Examiner* — Mekonnen Dagnew
(74) *Attorney, Agent, or Firm* — Moffat & Co.

(57) ABSTRACT

There is disclosed a system and method for geotagging objects on a mobile handheld communication device. In an embodiment, the method comprises: providing a user interface with a plurality of user selectable options for obtaining geographic location coordinates; receiving a user selection of one of the plurality of options; and tagging an object with the geographic location coordinates obtained from the selected one of the plurality of options. In another embodiment, the method may further comprise obtaining from an active global positioning system (GPS) module the geographic location coordinates for a current location to tag the object. The method may further comprise providing previously saved geographic location coordinates to tag the object. The object may be an image object.

18 Claims, 10 Drawing Sheets

SYSTEM AND METHOD FOR SELECTING A GEOGRAPHIC LOCATION TO ASSOCIATE WITH AN OBJECT

CROSS-REFERENCE TO RELATED APPLICATIONS

This application is a continuation of U.S. patent application Ser. No. 11/754,830 which was filed on May 29, 2007, the entire disclosure of which is hereby incorporated by reference for all purpose.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

FIELD OF THE INVENTION

The present invention relates generally to systems and methods for selecting a geographic location to associate with an object or action.

BACKGROUND

Recent advances with handheld wireless communication devices have resulted in the introduction of integrated cameras capable of capturing images at a resolution sufficient for many consumer applications. Once captured, the images may be stored in available memory on the communication device, and viewed on a display provided on the communication device. However, the available memory on the communication device may be limited, and a user may not be able to capture and store new images in the communication device without deleting images or other files already stored in memory. As well, while the user may enjoy the images on the communication device, the user may want to share the images with other users. However, there may be carrier network restrictions on transmission bandwidth. Also, if the images are to be shared, the ability to easily add descriptive information and location information about the images may be desirable.

What is needed is an improved system and method for selecting a geographic location to associate with an object or action.

DETAILED DESCRIPTION

As noted above, the present invention relates generally to systems and methods for selecting a geographic location to associate with an object or action.

Figure 1:
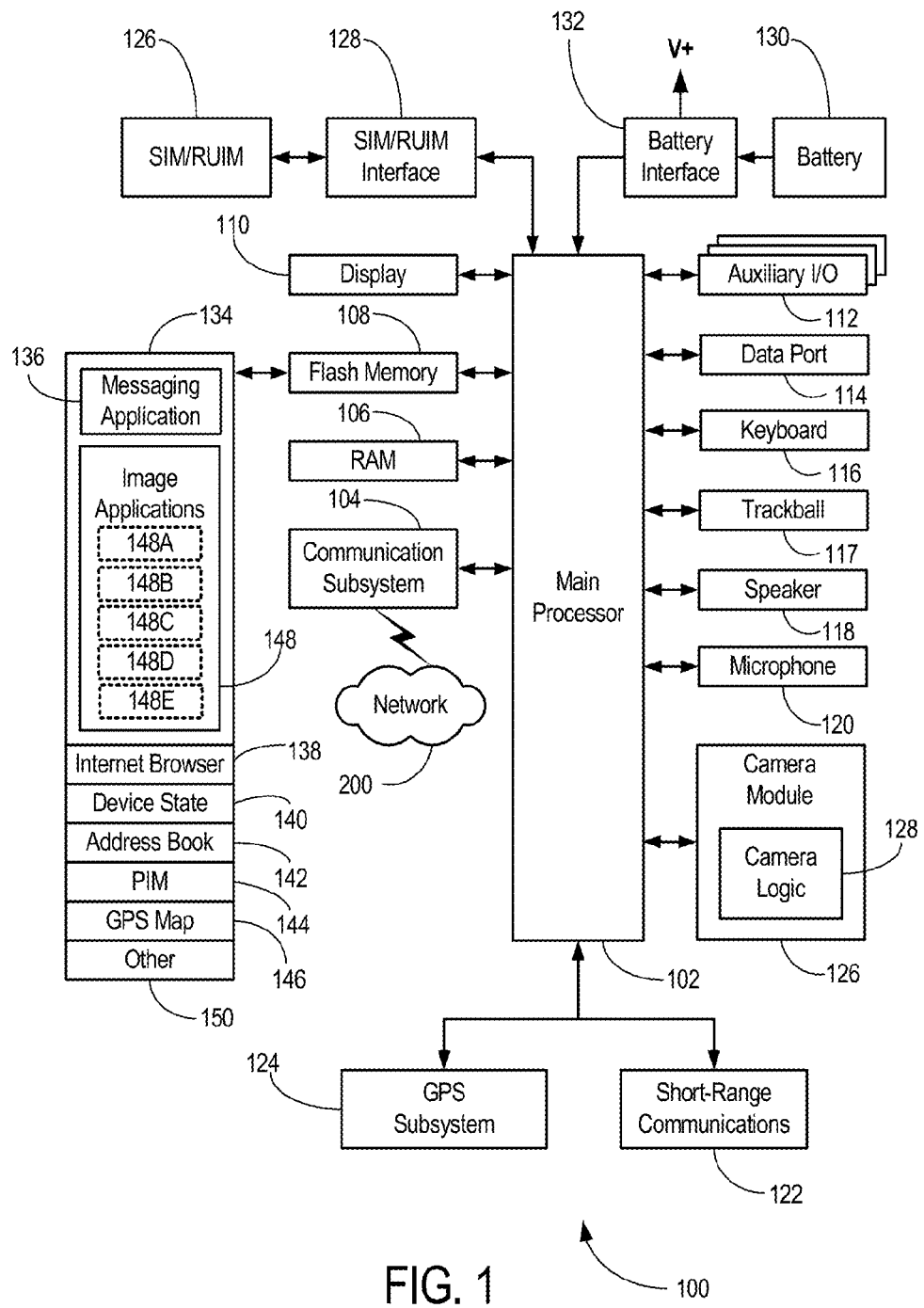
FIG. 1 is a schematic block diagram of various components that may be found in a handheld mobile communication device.

In an illustrative embodiment, the invention may be practiced with a handheld mobile communication device in a wireless operating environment. Shown in FIG. 1 is a schematic block diagram of an illustrative handheld mobile communication device 100. The communication device 100 may comprise a number of components, including a main processor 102 which controls the overall operation of communication device 100. Communication functions, including data and voice communications, may be performed through a communication subsystem 104. The communication subsystem 104 may receive messages from and send messages to a wireless network 200.

The main processor 102 may also interact with additional subsystems such as a random access memory (RAM) 106, a flash memory 108, a display 110, an auxiliary input/output (I/O) subsystem 112, a data port 114, a keyboard 116, a trackball 117, a speaker 118, a microphone 120, short-range communications 122, a GPS subsystem 124, a camera module 126, and associated camera logic 128.

Some of the subsystems of the communication device 100 may perform communication-related functions, whereas other subsystems may provide "resident" or on-device functions. By way of example, the display 110 and the keyboard 116 may be used for both communication-related functions, such as entering a text message for transmission over the network 200, and device-resident functions such as a calculator or task list. The trackball 117 may be used for various navigation functions, such as navigating through a graphical user interface (GUI) menu displayed on display 110. The trackball 117 may also be configured with a secondary actuation feature, such as allowing a user to depress the trackball, to allow selection of a highlighted item.

The GPS subsystem 124 may include a GPS antenna to receive signals transmitted by a minimum number of in-view GPS satellites required to acquire accurate latitude and longitude coordinates. The GPS system may also be operatively connected to the main processor 102 to pass the acquired latitude and longitude coordinates to one or more software applications 134, and to store the latitude and longitude coordinates as may be required into flash memory 108 or RAM 106. If the GPS antenna is not able to receive a signal from a sufficient number of in-view GPS satellites (e.g. because of buildings, bridges, or other obstructions, or because the communication device 100 is being used indoors), it may not be possible to acquire the GPS coordinates.

The camera module 126 may be adapted to capture an image through a lens onto a light sensitive image sensor such as a charge coupled device (CCD) sensor array or a complementary metal oxide semiconductor (CMOS) sensor array. The camera lens may be a fixed focus lens, or a variable focus lens with or without zoom features and controlled by camera logic 128 to focus an image onto the CCD or CMOS sensor array. The size and pixel density of the CCD or CMOS sensor array may be suitably selected for the image resolution required for a particular application. Camera logic 128 may also control the camera lens aperture and/or shutter speed by incorporating a suitable light exposure meter. Image capture using camera module 126 may initiated by a user controlling a dedicated camera shutter, or a context dependent programmable button or key (on keyboard 116, for example) that may act as a camera shutter button.

Once captured by the CCD or CMOS sensor array, the image may then be processed by camera logic 128 into a suitable digital image file format such as Joint Photographic Experts Group (JPEG), Tagged-Image File Format (TIFF), Bit Mapping (BMP), different variations on these standard image file formats, or a vendor proprietary RAW image format. The image file format may allow for the addition of image meta-data to an image file in an industry standards exchangeable image file format (EXIF), or in some vendor proprietary meta-data format.

The image file may then be stored in available device storage such as RAM 106 or flash memory 108, and displayed on display 110. As will be described in detail further below, in order to minimize consumption of potentially scarce memory resources on communications device 100, the captured image may be transmitted from communications device 100 to an Image Repository.

Still referring to FIG. 1, operating system software used by the main processor 102 is typically stored in a persistent store such as flash memory 108. Those skilled in the art will appreciate that the operating system, specific device applications, or parts thereof, may be temporarily loaded into a volatile store, such as the RAM 106, for processing by main processor 102.

The communication device 100 may send and receive communication signals over the wireless network 200 after required network registration or activation procedures have been completed. Network access may be associated with a subscriber or user of the communication device 100.

The communication device 100 may be a battery-powered device and may include a battery interface 132 for receiving one or more rechargeable batteries 130. In some embodiments, the battery 130 may be a smart battery with an embedded microprocessor. The battery interface 132 is coupled to a regulator (not shown), which assists the battery 130 in providing power V+ to the communication device 100. The battery 130 may be used to power all components and modules in the communication device 100, including the camera module 126 and associated camera logic 128.

The main processor 102, in addition to its operating system functions, enables execution of various software applications 134 on the communication device 100. A subset of software applications 134 that control basic device operations, including data and voice communication applications, will normally be installed on the communication device 100 during its manufacture.

The software applications 134 may include a messaging application 136. The messaging application 136 can be any suitable software program that allows a subscriber or user of the communication device 100 to send and receive wireless text communications. Various alternatives exist for the messaging application 136 as is well known to those skilled in the art. Messages that have been sent or received by the user are typically stored in local storage such as flash memory 108 of the communication device 100, or in some other suitable storage element in the communication device 100. In an alternative embodiment, some of the sent and received messages may be stored remotely from the communication device 100 such as in a data store of an associated host system that the communication device 100 communicates with. In an embodiment, the messaging application 136 may include a Message List user interface that is configured to allow a user to see a list of message objects (i.e. email messages) in a convenient list form. This will be described in detail further below.

The software applications 134 may also include a GPS map application 146 for providing geographic navigation, and location coordinates for geotagging objects. GPS map application 146 may be configured to operatively connect to GPS subsystem 124 to receive GPS latitude and longitude coordinates for a current position of the communication device 100. GPS map application 146 may also store scalable maps of various geographic regions in order to show the current position of communication device 100 on the map. As well, the GPS map application 146 may be configured to obtain latitude and longitude location coordinates by allowing a user to select a position on the GPS map.

Still referring to FIG. 1, communication device 100 may execute an Image Applications Module 148 that may be operatively integrated with camera module 126, camera logic 128, main processor 102, RAM 106, display 110 and various other modules and components to provide various image application functions for the images captured by the camera module 126. Image Applications Module may include various sub modules such as an Image Upload Module 148B, an Image Resizing Module 148C, a Message Integration Module 148D, and an Image Geotagging Module 148E. These various sub modules may interact with each other, and with other application modules such as the messaging application 136, Internet browser module 138, address book module 142, GPS map module 146, etc. in order to perform various functions. Image Applications Module 148 and its sub modules will be described in more detail further below.

The communication device 100 may further include a device state module 140, an address book 142, a Personal Information Manager (PIM) 144, and various other modules 150. Additional software applications may also be loaded onto the communication device 100 through at least one of the wireless network 200, the auxiliary I/O subsystem 112, the data port 114, the short-range communications subsystem 122, or other device subsystem 124.

Figure 2:
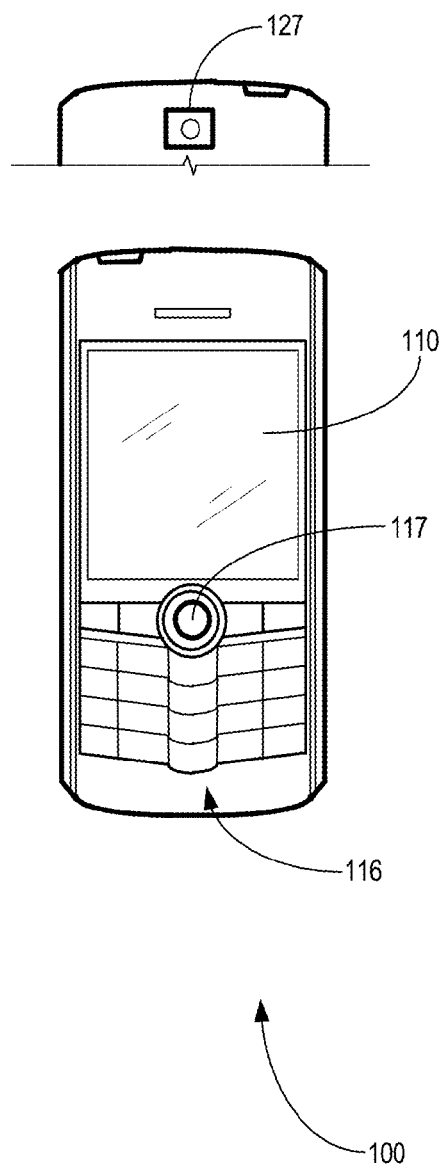
FIG. 2 is an illustrative example of a handheld mobile communication device that may provide an operating environment.

Now referring to FIG. 2, shown is an illustrative front view of a handheld mobile communication device 100 that may provide a suitable operating environment. As shown, the communication device 100 may include a display 110, a keyboard 116, and other input or navigation means such as a trackball 117. The display 110 may be configured to display various screens allowing the user of device 100 to view screen outputs from the various software applications 134, including the image applications 148. Display 110 may also be configured to provide a touch-sensitive screen input in response to a prompt or query displayed on display 110. The communication device 100 may further include a camera lens that may be used to capture an image as described above with reference to FIG. 1. In an embodiment, the integrated camera 126 may provide a camera lens 127 on the back of the communication device 100, such that a user may use the display 110 as a camera viewfinder for framing an image.

Figure 3:
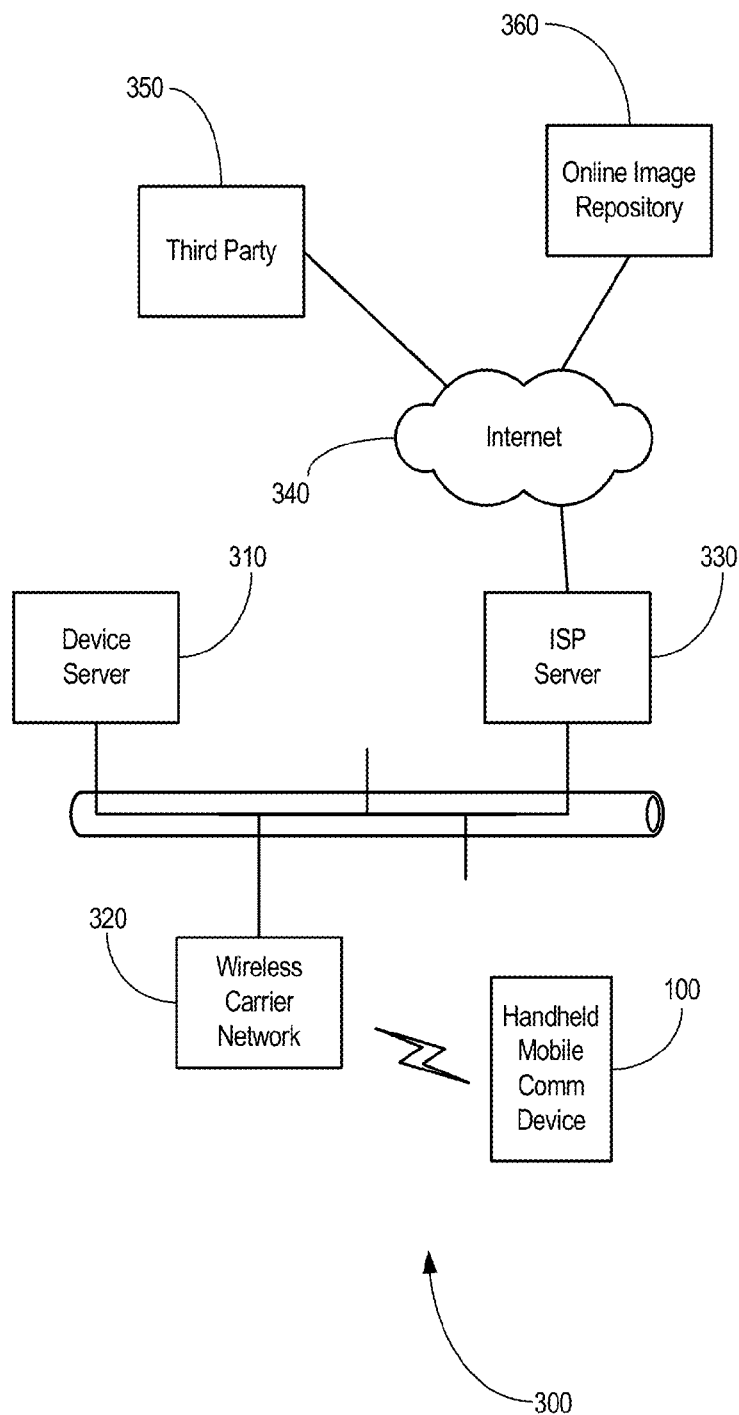
FIG. 3 is a block diagram of an illustrative example of a network environment in which various embodiments may be practiced.

Now referring to FIG. 3, shown is a schematic block diagram of an illustrative network environment 300 in which various embodiments of the invention may be practiced. As shown, network environment 300 may include a device server 310 operatively connected to the handheld mobile communication device 100 via a wireless carrier network 320. An Internet Service Provider (ISP) server 330 may also be provided in the network environment 300 such that a user of device 100 may access the Internet 340 from the device 100.

In an embodiment, the Internet 340 may provide access to an Image Repository 360. Membership to use the Image Repository 360 may be free, or may be by paid subscription, for example. The Image Repository 360 may also be accessible by a third party 350 that has membership to the Image Repository 360. As well, the Image Repository 360 may be accessed from other handheld mobile communication devices 100B within wireless carrier network 320, or from other compatible communication devices 100C with access to Internet 340.

Figure 4A:
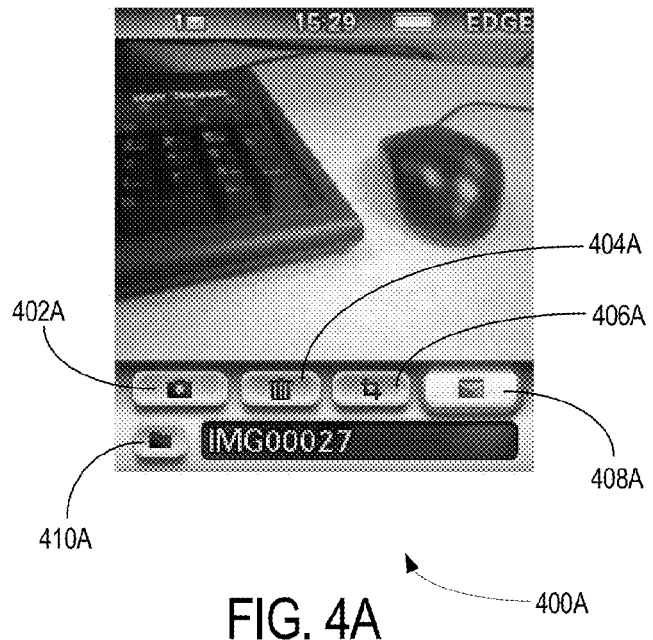
FIGS. 4A to 4K are screen captures of illustrative user interfaces in accordance with various embodiments.

Now referring to FIGS. 4A to 4K, shown are illustrative user interfaces in accordance with various embodiments. First, referring to FIG. 4A, shown is an illustrative integrated camera user interface screen 400A displaying an illustrative image "IMG00027" captured by the integrated camera (e.g. by camera module 126 and camera logic 128 as previously described). As shown, the camera user interface 400A may include icons such a "camera mode" icon 402A, a "delete image" icon 404A, a "crop image" icon 406A, a "mail image" icon 408A, and an "images folder" icon 410A.

Figure 4B:
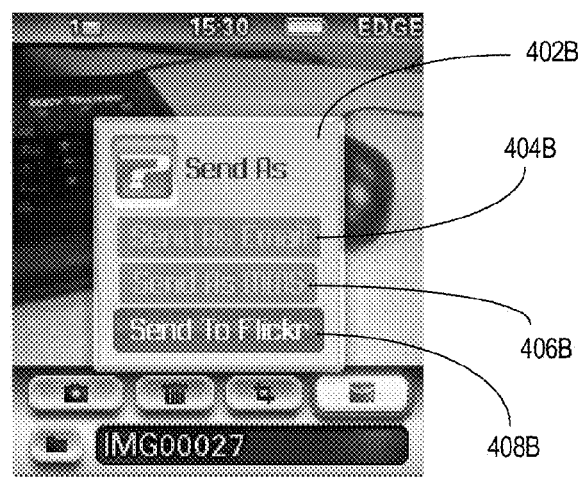

Referring to FIG. 4B, shown is a camera user interface screen 400B now including a "Send . . . " pop-up menu 402B. In this illustrative example, the "Send . . . " pop-up menu 402B includes a number of menu options including "Send as Email" 404B, "Send as MMS (Multimedia Messaging Service)" 406B, and "Send To (Image Repository)" 408B (e.g. where the Image Repository may be an online image repository such as Flickr™, for example). These "Send . . . " options will be described in more detail further below.

Figure 4C:
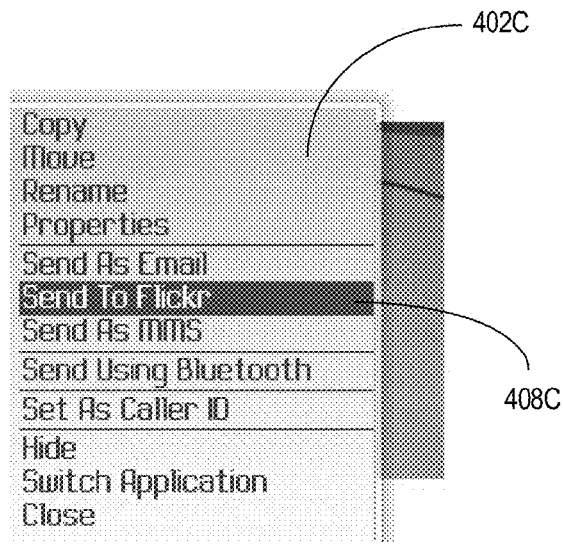

FIG. 4C shows a user interface screen 400C with a context menu 402C that may also provide the "Send . . . " menu options as described above, including "Send to (Image Repository)" 408C. This context menu 402C may be another one of several ways in which the "Send to (Image Repository)" option may be accessed, and will be discussed in more detail further below.

Figure 4D:
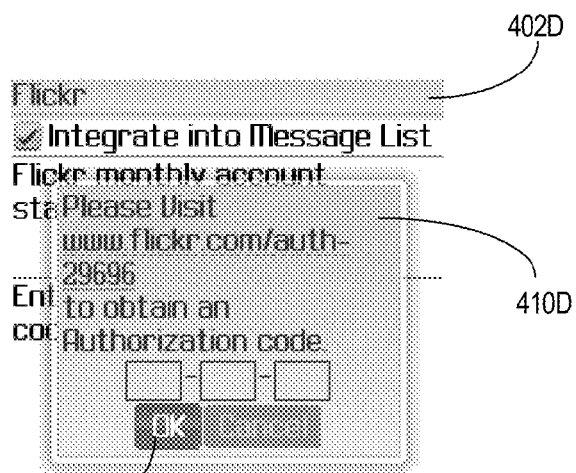

Now referring to FIG. 4D, shown is a user interface screen 400D with an option settings menu 402D for the "Send to (Image Repository)" option in which records of images uploaded to an Image Repository may be integrated into a Message List. The Message List may be a chronological listing of different types of objects that may include, for example, email messages, message status reports, telephone call records, etc. This Message List integration will be described in more detail further below.

Figure 4E:
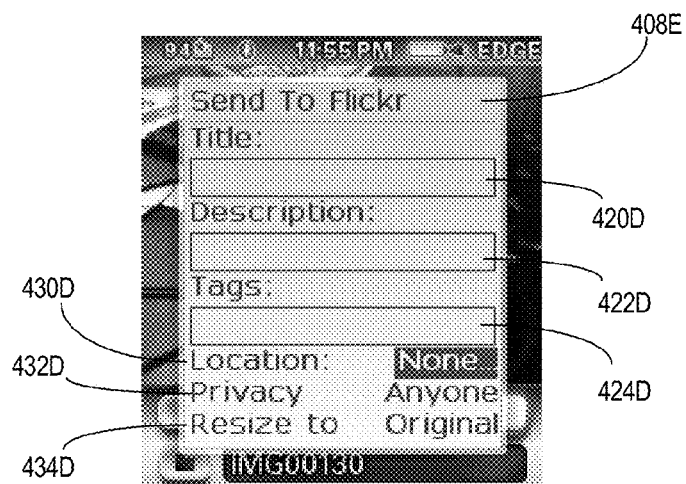

Now referring to FIG. 4E, shown is a user interface screen 400E with a "Send to (Image Repository)" window 408E in which a number of text entry fields are provided to allow the user to add descriptive information, such as "Title", "Description", and "Tags". Furthermore, the "Send to (Image Repository)" window may include various other options such as a geographic "Location" field 430D, a "Privacy" setting 432D, and an image "Resize to" setting 434D. These various settings and features will be discussed in more detail further below.

Figure 4F:
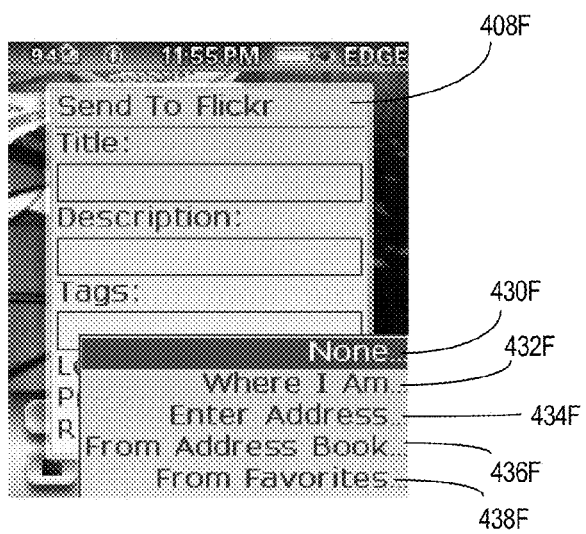

FIG. 4F shows a user interface screen 400F with an illustrative "Send to (Image Repository)" window 408F which may include various options for selecting a geographic location, such as "None" 430F, a "Where I Am . . . " option 432F, an "Enter Address . . . " option 434F, a "From Address Book . . . " option 436F, and a "Favorites" option 438F. These various options will be discussed in more detail further below.

Figure 4G:
Figure 4H:
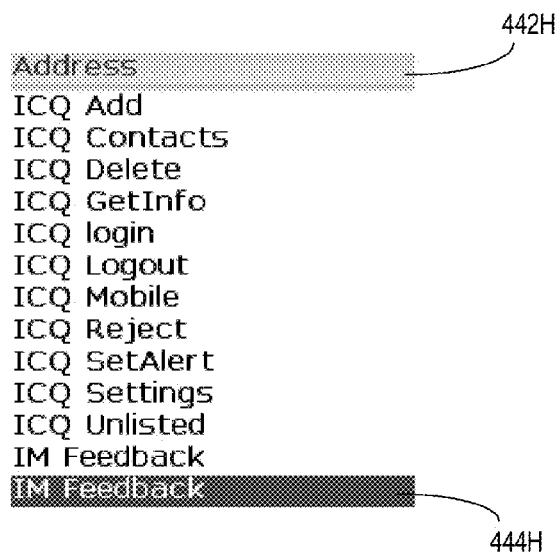

Now referring to FIG. 4G, shown is a user interface screen 400G with an illustrative "Send to (Image Repository)" screen 408G with an "Enter Address" pop-up window 440G. For example, in order to obtain geographic coordinates by address, a user may fill out one or more of the following fields: Address 442G, City 444G, State/Province 446G, and Country 448G. Alternatively, FIG. 4H shows a user interface 400H with an illustrative example of an address list 442H from which a target address 444H may be selected. With the specification of an address, or the selection of a target address from a list, the corresponding geographic coordinates may be obtained from a GPS mapping application (e.g. GPS map module 146). This feature will be described in more detail further below.

Figure 4I:
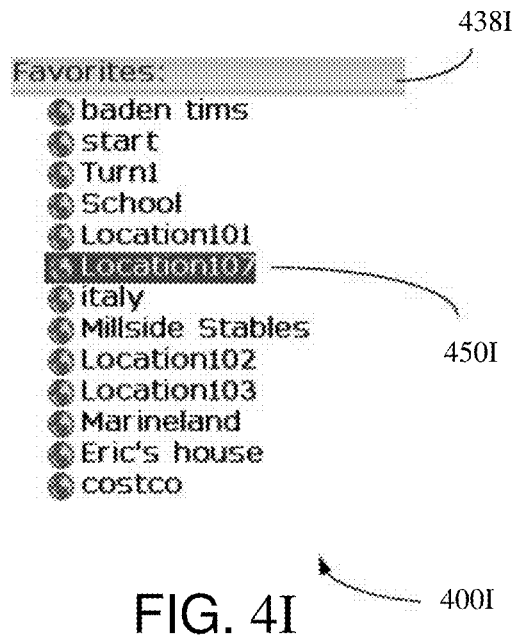

Now referring to FIG. 4I, shown is a user interface screen 400I with an illustrative list of location "Favorites" 438I from which a "favorite" location 450I may be selected for the purposes of obtaining the corresponding geographic coordinates. This feature will be described in more detail further below.

Figure 4J:
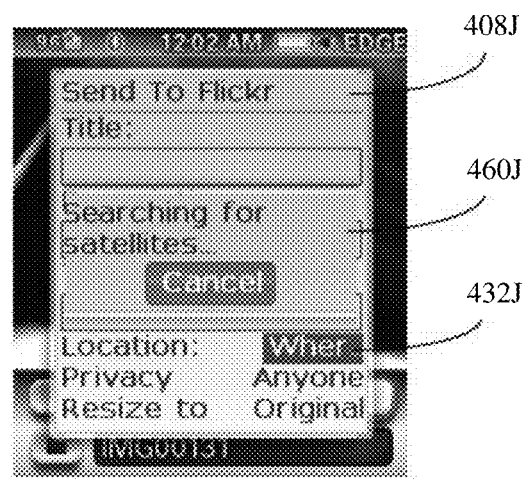

Now referring to FIG. 4J, shown is a user interface screen 400J with an illustrative "Send To (Image Repository)" screen 408J in which the "Where I Am . . . " option has been selected to obtain the geographic location. In order to determine the current location, the device 100 may search for and try to acquire GPS signals using the GPS subsystem 124, as indicated in pop-up message 460J.

Figure 4K:
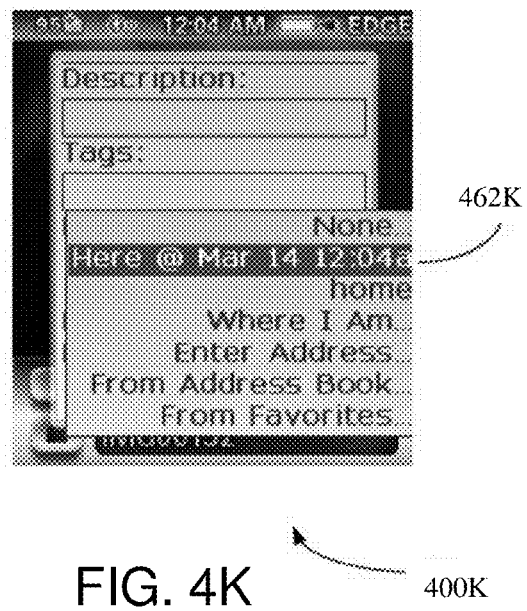

Now referring to FIG. 4K, shown is a user interface screen 400K with an illustrative geographic location menu in which a new location entry 462K (e.g. "Here @ March 14 12:04a") has been added. The use of this geographic location acquired through the "Where I Am . . . " option will be described in more detail further below.

Now referring to FIG. 5E, and referring back to FIGS. 4A to 4K as necessary, various embodiments will be described in detail.

In an embodiment, an Image Geotagging Module 148E may be configured to allow a user to select a geographic location and to tag an image with geographic information. Acquiring a geographic location from the GPS subsystem 124 may sometimes take a long time. If satellite signals are blocked by any obstructions such as tall buildings or bridges, it may not be possible to acquire a GPS location at all. Thus in order to avoid a long delay in acquiring geographic location coordinates, or not being able to acquire them at all, a user may be provided with alternative sources for obtaining geographic location coordinates.

Figure 5E:
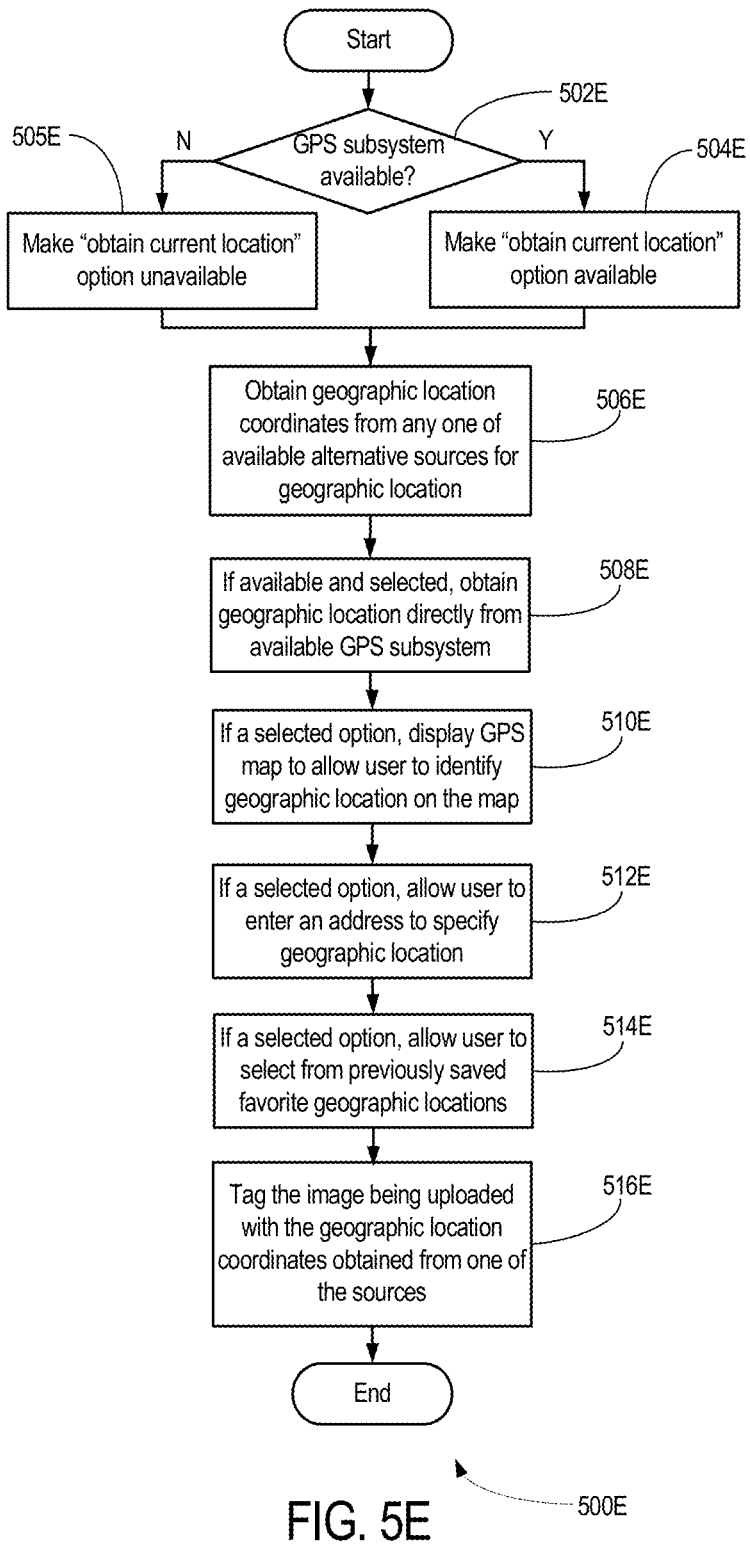
FIG. 5E is a flowchart of an illustrative method for selecting a geographic location to associate with an object in accordance with an embodiment.

FIG. 5E is a flowchart of an illustrative method 500E for selecting a geographic location to associate with an object or action. Method 500E begins, and at decision block 502E checks to determine if a GPS subsystem or module is available for the communication device 100 to acquire GPS coordinates. If yes, method 500E may proceed to block 504E, where method 500 may make an "obtain current location" option available. For example, Image Geotagging Module 148E may be configured by method 500E to provide a user with a number of user selectable options from a geographic location selection drop down menu, such as: 1) Don't Geotag; 2) The Last Five Used Locations; 3) Last GPS Location; 4) Where I Am (Current Location, if GPS enabled); 5) Enter an Address; 6) Address from Address Book; 7) Select From Saved Favourite Locations. Except for option 1, each of these options may provide latitude and longitude coordinates for use in geotagging an image.

In an embodiment, if the answer at decision block 502E is no, method 500E may proceed to block 505E and configure the Image Geotagging Module 148E such that the "obtain current location" option is made unavailable for selection. For example, of the GPS module is turned off, or if a GPS signal cannot be received (e.g. because the communication device 100 is being used indoors), then option 4) "Where I Am" may be made unavailable for user selection.

In an embodiment, at block 506E, method 500E may configure the Image Geotagging Module 148E such that the geographic location coordinates may be obtained from any one of the alternative sources may be used and placed into the image file. Thus, it is not necessary to acquire a GPS signal each time an image needs to be geotagged. As well, an image taken earlier at another location may be properly geotagged by selecting a geographic location source corresponding to that previous location. It will be appreciated that the exact geographic location of a previous point need not be known. For example, for some applications such as travel photos, identifying a general geographic location using a city name, for example, may be sufficient.

Thus, in an embodiment, if selected as an available option at block 508E, method 500E may configure the Image Geotagging Module 148E to obtain the current geographic location coordinates directly from the GPS subsystem 124.

In another embodiment, if selected as an available option at block 510E, method 500E may configure the Image Geotagging Module 148E to interoperate with GPS Map module 146 such that a map 500 may appear on display 110 of communication device 100. The user may then navigate the map on display 110 by scrolling left or right, or up and down using dedicated or multifunction navigation keys, for example. Alternatively, if display 110 is configured as a touch screen, a user may touch the display 110 to navigate the map. After moving to a desired point on the map using the navigation keys, a user may select the geographic location by pressing a selection key, for example. The latitude and longitude coordinates at the desired point may then be calculated and passed back to the Image Geotagging Module 148E.

In another embodiment, if selected as an option at block 512E, method 500E may configure the Image Geotagging Module 148E such that the user may enter an address (e.g. as shown in FIG. 4G) to identify the geographic location. The user may need to provide, for example, the street number and name, the city, the state or province, and the country. Upon entering the address, the Image Geotagging Module 148E may query the corresponding geographic location coordinates from a geographic location reference database, and the coordinates may be passed back to the Image Geotagging Module 148E for use in geotagging images.

In another embodiment, if selected as an option at block 514E, method 500E may configure the Image Geotagging Module 148E such that geographic location coordinates may be obtained by selecting from a list of previously saved "favorite" locations. Upon selection of the previously saved location, the geographic location coordinates may be made available to the Image Geotagging Module 148E for use in geotagging images.

Method 500E may then proceed to block 516E, where method 500E may configure the Image Geotagging Module 148E to geotag an image using the geographic location coordinates obtained from the selected option. Method 500E may then end.

Thus, in an aspect of the invention, there is provided a method of geotagging objects on a mobile handheld communication device, comprising: providing a user interface with a plurality of user selectable options for obtaining geographic location coordinates; receiving a user selection of one of the plurality of options; and tagging an object with the geographic location coordinates obtained from the selected one of the plurality of options.

In an embodiment, the method further comprises obtaining from an active global positioning system (GPS) module the geographic location coordinates for a current location to tag the object.

In another embodiment, the method further comprises providing previously saved geographic location coordinates to tag the object.

In another embodiment, the method further comprises: providing a list of previously saved geographic location coordinates; receiving a user selection of one of the previously saved geographic location coordinates; and using the selected previously saved geographic location coordinates to tag the object.

In another embodiment, the method further comprises: providing a list of previously saved addresses, each address being associated with geographic location coordinates; receiving a user selection of one of the previously saved addresses; and using the geographic location coordinates associated with the selected address to tag the object.

In another embodiment, the method further comprises: receiving a user specified address; obtaining geographic location coordinates associated with the user specified address; and using the geographic location coordinates associated with the user specified address to tag the object.

In another embodiment, the object is an image object.

In another aspect of the invention, there is provided a system for geotagging objects on a mobile handheld communication device, the system comprising a geotagging module adapted to: provide a user interface with a plurality of user selectable options for obtaining geographic location coordinates; receive a user selection of one of the plurality of options; and tag an object with the geographic location coordinates obtained from the selected one of the plurality of options.

In an embodiment, the geotagging module is further adapted to obtain from an active global positioning system (GPS) module the geographic location coordinates for a current location to tag the object.

In another embodiment, the geotagging module is further adapted to provide previously saved geographic location coordinates to tag the object.

In another embodiment, the geotagging module is further adapted to: provide a list of previously saved geographic location coordinates; receive a user selection of one of the previously saved geographic location coordinates; and use the selected previously saved geographic location coordinates to tag the object.

In another embodiment, the geotagging module is further adapted to: provide a list of previously saved addresses, each address being associated with geographic location coordinates; receive a user selection of one of the previously saved addresses; and use the geographic location coordinates associated with the selected address to tag the object.

In another embodiment, the geotagging module is further adapted to: receive a user specified address; obtain geographic location coordinates associated with the user specified address; and use the geographic location coordinates associated with the user specified address to tag the object.

In another embodiment, the object is an image object.

In another aspect of the invention, there is provided a data processor readable medium storing data processor code that when loaded onto a mobile handheld communication device adapts the device to geotagging objects, the data processor readable medium comprising: code for providing a user interface with a plurality of user selectable options for obtaining geographic location coordinates; code for receiving a user selection of one of the plurality of options; and code for tagging an object with the geographic location coordinates obtained from the selected one of the plurality of options.

In an embodiment, the data processor readable medium further comprises code for obtaining from an active global positioning system (GPS) module the geographic location coordinates for a current location to tag the object.

In another embodiment, the data processor readable medium further comprises code for providing previously saved geographic location coordinates to tag the object.

In another embodiment, the data processor readable medium further comprises: code for providing a list of previously saved geographic location coordinates; code for receiving a user selection of one of the previously saved geographic location coordinates; and code for using the selected previously saved geographic location coordinates to tag the object.

In another embodiment, the data processor readable medium further comprises: code for providing a list of previously saved addresses, each address being associated with geographic location coordinates; code for receiving a user selection of one of the previously saved addresses; and code for using the geographic location coordinates associated with the selected address to tag the object.

In another embodiment, the data processor readable medium further comprises code for receiving a user specified address; code for obtaining geographic location coordinates associated with the user specified address; and code for using the geographic location coordinates associated with the user specified address to tag the object.

While illustrative embodiments have been described above, it will be appreciated that various changes and modifications may be made. More generally, the scope of the invention is defined by the following claims.

What is claimed is:

1. A method of communicating a digital image using a mobile communication device, the method comprising:
    displaying a camera interface on a display of the mobile communication device;
    displaying a digital image captured using a camera of the mobile communication device;
    geotagging the digital image with location data to create a geotagged digital image;
    displaying simultaneously on the display of the mobile handheld communication device a plurality of destination options for sending the geotagged digital image, wherein the destination options include at least a first option to e-mail the geotagged digital image, a second option to send the geotagged digital image via Multimedia Messaging Service (MMS) and a third option to send the geotagged digital image to an online image repository for viewing by others;
    in response to receiving a user selection of one of the plurality of destination options, sending the geotagged digital image by e-mail or by MMS or to the online image repository.

2. The method of claim 1 further presenting a fourth option to associate the geotagged digital image with a caller ID.

3. The method of claim 1 wherein the location data is obtained by a position-determining subsystem of the mobile communication device.

4. The method of claim 2 wherein the location data is obtained by a position-determining subsystem of the mobile communication device.

5. The method of claim 1 wherein displaying the destination options comprises displaying a menu superimposed on the camera interface, the menu displaying the first, second and third options.

6. The method of claim 1 further comprising displaying a dialog to enter an authorization code to upload the geotagged digital image to the online image repository.

7. A mobile communication device comprising:
    a processor coupled to a memory, the processor being configured to cooperate with a display to:
        display a camera interface on a display of the mobile communication device;
        display a digital image captured using a camera of the mobile communication device;
        geotag the digital image with location data to create a geotagged digital image:
        display simultaneously on the display of the mobile handheld communication device a plurality of destination options for sending the geotagged digital image, wherein the destination options include at least a first option to e-mail the geotagged digital image, a second option to send the geotagged digital image via Multimedia Messaging Service (MMS) and a third option to send the geotagged digital image to an online image repository for viewing by others;
        in response to receiving a user selection of one of the plurality of destination options, send the geotagged digital image by email or by MMS or to the online image repository using a radiofrequency transceiver.

8. The mobile communication device of claim 7 wherein the processor causes the display to further present a fourth option to associate the geotagged digital image with a caller ID.

9. The mobile communication device of claim 7 wherein the location data is obtained by the position-determining subsystem.

10. The mobile communication device of claim 8 wherein the location data is obtained by the position-determining subsystem.

11. The mobile communication device of claim 7 wherein the processor causes the display to display the destination options as a menu superimposed on the camera interface, the menu displaying the first, second and third options.

12. The mobile communication device of claim 7 wherein the processor causes the display to further display a dialog to enter an authorization code to upload the geotagged digital image to the online image repository.

13. A non-transitory computer-readable medium which when loaded into a memory of a mobile communication device and executed by a processor of the mobile communication device causes the mobile communication device to:
    display a camera interface on a display of the mobile communication device;
    display a digital image captured using a camera of the mobile communication device;
    geotag the image with location data to create a geotagged digital image;
    display simultaneously on the display of the mobile handheld communication device a plurality of destination options for sending the geotagged digital image, wherein the destination options include at least a first option to e-mail the geotagged digtal image, a second option to send the geotagged digital image via Multimedia Messaging Service (MMS) and a third option to send the geotagged digital image to an online image repository for viewing by others;
    in response to receiving a user selection of one of the plurality of destination options, send the geotagged digital image by e-mail or by MMS or to the online image repository.

14. The non-transitory computer-readable medium of claim 13 further presenting a fourth option to associate the geotagged digital image with a caller ID.

15. The non-transitory computer-readable medium of claim 13 wherein the location data is obtained by a position-determining subsystem of the mobile communication device.

16. Wherein the location data is obtained by a position-determining subsystem of the mobile communication device.

17. The non-transitory computer-readable medium of claim 13 wherein the code for displaying the destination options comprises code for displaying a menu superimposed on the camera interface, the menu displaying the first, second and third options.

18. The non-transitory computer-readable medium of claim 13 further comprising code for displaying a dialog to enter an authorization code to upload the geotagged digital image to the online image repository.

* * * * *

UNITED STATES PATENT AND TRADEMARK OFFICE
CERTIFICATE OF CORRECTION

PATENT NO.         : 9,183,229 B2
APPLICATION NO.    : 14/329169
DATED              : November 10, 2015
INVENTOR(S)        : Gerhard Dietrich Klassen et al.

Page 1 of 1

It is certified that error appears in the above-identified patent and that said Letters Patent is hereby corrected as shown below:

In The Claims

Column 11, Lines 1-2, please correct "Wherein the location data is obtained by a position-determining subsystem of the mobile communication device" to read "The non-transitory computer-readable medium of claim 14 wherein the location data is obtained by a position-determining subsystem of the mobile communication device"

Signed and Sealed this
Twelfth Day of April, 2016

Michelle K. Lee
*Director of the United States Patent and Trademark Office*